United States Patent
Collins, Jr.

(10) Patent No.: US 11,461,366 B1
(45) Date of Patent: Oct. 4, 2022

(54) SYSTEM AND METHOD FOR DATA PRUNING VIA DYNAMIC PARTITION MANAGEMENT

(71) Applicant: BNSF Railway Company, Fort Worth, TX (US)

(72) Inventor: Robert McKinley Collins, Jr., Argyle, TX (US)

(73) Assignee: BNSF Railway Company, Fort Worth, TX (US)

( * ) Notice: Subject to any disclaimer, the term of this patent is extended or adjusted under 35 U.S.C. 154(b) by 0 days.

(21) Appl. No.: 17/506,283

(22) Filed: Oct. 20, 2021

(51) Int. Cl.
*G06F 16/27* (2019.01)
*G06F 16/22* (2019.01)

(52) U.S. Cl.
CPC ........ *G06F 16/278* (2019.01); *G06F 16/2282* (2019.01)

(58) Field of Classification Search
CPC .................................................. G06F 16/278
USPC ........................................................ 707/803
See application file for complete search history.

(56) References Cited

U.S. PATENT DOCUMENTS

| | | | |
|---|---|---|---|
| 6,092,062 | A | 7/2000 | Lohman et al. |
| 7,680,761 | B2 | 3/2010 | Zait et al. |
| 10,013,466 | B2 | 7/2018 | Zimmerer |
| 10,223,419 | B2 | 3/2019 | Zhou |
| 11,061,930 | B1* | 7/2021 | Golding ................ G06F 3/0611 |
| 2007/0198591 | A1* | 8/2007 | Teng .................... G06F 16/2282 |
| 2012/0254174 | A1* | 10/2012 | Mitra .................. G06F 16/1752 707/737 |
| 2015/0106407 | A1* | 4/2015 | Adayilamuriyil ..... G06F 16/284 707/804 |
| 2017/0199666 | A1* | 7/2017 | Sundaram ............. G06F 3/0644 |
| 2019/0065573 | A1* | 2/2019 | Keller ................. G06F 16/2453 |
| 2019/0087457 | A1 | 3/2019 | Bellamkonda et al. |
| 2020/0125666 | A1* | 4/2020 | Eadon ................... G06F 16/278 |
| 2020/0257675 | A1 | 8/2020 | Wei et al. |

OTHER PUBLICATIONS

Herodotou et al., Query Optimization Techniques for Partitioned Tables, Dec. 31, 2011.
Gorawski et al., Efficient Storage, Retrieval and Analysis of Poker Hands: an Adaptive Data Framework, Dec. 31, 2017.

* cited by examiner

*Primary Examiner* — Muluemebet Gurmu
(74) *Attorney, Agent, or Firm* — Enrique Sanchez; Whitaker Chalk Swindle & Schwartz, PLLC

(57) ABSTRACT

A system and method for managing data lifecycles that can provide an adaptable data management system configured to optimize the lifecycles of data and the reliability of databases. The system can provide data management systems with the ability to attach, detach, and drop segments of data based on key partitions of the data objects to optimize database utilization. By including the key partitions to the data objects, the database including the data objects can now perform data management operations based on the key partitions. The system, based on the key partitions, can identify a location of the data object to attach row entries, detach row entries from the existing tables, and delete the detached row entries from the database altogether. The system can operate on any relational database management system.

30 Claims, 9 Drawing Sheets

SYSTEM AND METHOD FOR DATA PRUNING VIA DYNAMIC PARTITION MANAGEMENT

TECHNICAL FIELD

The present disclosure relates generally to database management, and more particularly to systems and methods for dynamically partitioning and managing data at the partition level.

BACKGROUND

Database management can be a resource expensive task requiring computation resources for mundane operations. As the size of databases increase over time, the computation cycle time for data deletion requests cannot compare with data addition operations leading to an imbalance in the size of data growth. Additionally, managing the data can prove difficult especially when a user purges the data instructing the database to add or delete the row entries for an entire data object. Generally, the database executes the addition or deletion operations line by line. The subsequent row deletion operations result in time-consuming and resource-expensive tasks that cannot perform efficiently for the volume of modern data objects.

While conventional database management can incorporate traditional approaches to data management, the existing techniques are often impractical when faced with a great volume of data. The volume of data for many corporations would contain millions, or even billions of rows of data. If the company wants to add any current and future data to a historic data object, this could mean incorporating another high-volume data object to the historic data object, thereby compounding the data management problems. Currently, when a company seeks to incorporate the two data objects, the corresponding databases would individually parse and execute the row operations to merge the new data object with the historic data object resulting in resource intensive computation cycles, time, and cost to the company.

SUMMARY

The present disclosure achieves technical advantages as a system and method for data pruning via dynamic partition management that can provide an adaptable data management system configured to optimize the lifecycles of data and the reliability of databases. The present disclosure allows more flexibility in database configuration than traditional databases. The system can provide a parameter configuration file with a range of options for customized data management such as table spaces, extent size, period of attach or detach, and retention period. The system can also dynamically generate the SQL statements for attach and detach operations based on the content of a configuration file. To achieve greater table optimization, the system can run multiple threads and processes concurrently on each table. The system can also provide an effective cleanup process at the end of the operation and robust exception handlers. The system can operate on any relational database management system, such as DB2, ORACLE, SQL, and POSTGRESQL, among other suitable databases. The system can include partition creation validation checks and can automatically function based on the configuration parameters.

The present disclosure solves the technological problem of database growth and continuous execution of the purge process by providing data management systems with the ability to attach, detach, and drop segments of data based on partitions of the data objects to optimize database utilization. The present disclosure resolves issues of cumbersome database operation processes in data heavy environments by transforming general-purpose computers into a special purpose computer programmed to perform the claimed functionality. For example, to delete data objects in some conventional modern databases, delete operations would be executed for each row resulting in extensive computation resources. Having the delete process sequentially process the removal of tabular data is time consuming wasting organizational resources. The present disclosure further creates forward-looking flexibility by managing data with the capability to add row entries to and detach row entries from existing data objects. The ability to perform the attach and detach operations on data objects is based on key partitions assigned to both the row entries and the data object. Ultimately, the key partitions are used to hash the key partitions of the data to the key partitions of the data object for optimum computation time. The algorithms of the present disclosure can be applied to combination of hash partitioning and range partitioning or range partitioning alone. The advantage of partitioning a table is to selectively process subset of partition data and also prune millions of rows in one single operation.

The present disclosure improves the performance and functionality of database systems by managing associative partitions of the data and the database to optimize data object management using the disclosed algorithms. Advantageously, a configuration file can provide system thresholding to customize and optimize data partition characteristics. For example, a database including millions of row entries can append a key partition to the entries for identification, and the present disclosure can identify and access the row entries by the identification. By appending the key partition to the row entries, the database including the data object can now perform data management operations based on the key partition, rather than parsing the rows individually. Based on the key partition, a system can identify a location of the data object to attach row entries, to detach row entries from the existing tables, and to delete the detached row entries from the database altogether. The configuration file can include the threshold values for such database management operations.

It is an object of the invention to provide a system for managing data lifecycles. It is a further object of the invention to provide a method of managing data lifecycles. It is a further object of the invention to provide a computer-implemented method for managing data lifecycles. It is a further object of the invention to provide a method for dynamically partitioning and managing data at the partition level. These and other objects are provided by at least the following embodiments.

In one embodiment, a system for managing data lifecycles can include: a memory having a database with a plurality of tables for data management; and a networked computer processor operably coupled to the memory and capable of executing machine-readable instructions to perform program steps, the program steps can include: receiving a database instruction; identifying at least one action and at least one partition key from the database instruction; building, in response to the at least one partition key, a tablespace to attach first partitioned data to a table of the database when the at least one action includes an add partition instruction; identifying metrics from the table; comparing a first quantity of partitions to a second quantity of partitions to determine whether an operational requirement is satisfied; and detaching, in response to the at least one partition key, second partitioned data from the table when the at least one action includes a detach partition instruction and partition information of the metrics satisfies a partition quantity requirement of the table. Wherein if the operational requirement is satisfied, then the system can support the at least one partition key. Wherein the database instruction comprises single key information, wherein the program steps can further comprise obtaining a member list of the table; determining a range for the single key information; and generating statements to alter the table based on the member list and the range. Wherein the range can comprise date information such as a year, a month, a week, a day, and an hour. Wherein the database instruction can comprise multi-key information, wherein the program steps can further comprise obtaining a member list of the table; determining a key pattern of the table and a range for the single key information; and generating statements to alter the table based on the member list and the range. Wherein the range can comprise date information such as a year, a month, a week, a day, and an hour. Wherein the program steps can further comprise generating a retention object when the at least one action includes a retain partition instruction; and adding the second partitioned data to another table to retain the second partitioned data. Wherein the program steps can further comprise deleting the second partitioned data from the database when the second partitioned data reaches a time limit.

In another embodiment, a method of managing data lifecycles can include: receiving a database instruction; identifying at least one action and at least one partition key from the database instruction; building, in response to the at least one partition key, a tablespace to attach first partitioned data to a table of the database when the at least one action includes an add partition instruction; identifying metrics from the table; comparing a first quantity of partitions to a second quantity of partitions to determine whether an operational requirement is satisfied; and detaching, in response to the at least one partition key, second partitioned data from the table when the at least one action includes a detach partition instruction and partition information of the metrics satisfies a partition quantity requirement of the table. Wherein if the operational requirement is satisfied, then the system can support the at least one partition key. Wherein the database instruction can comprise single-key information, wherein the program steps can further comprise obtaining a member list of the table; determining a range for the single key information; and generating statements to alter the table based on the member list and the range. Wherein the range can comprise date information such as a year, a month, a week, a day, and an hour. Wherein the database instruction can comprise multi-key information, wherein the program steps can further comprise obtaining a member list of the table; determining a key pattern of the table and a range for the single-key information; and generating statements to alter the table based on the member list and the range. Wherein the range can comprise date information such as a year, a month, a week, a day, and an hour. Wherein the program steps can further comprise generating a retention object when the at least one action includes a retain partition instruction; and adding the second partitioned data to another table to retain the second partitioned data. Wherein the program steps can further comprise deleting the second partitioned data from the database when the second partitioned data reaches a time limit.

In another embodiment, a computer-implemented method for managing data lifecycles, the computer-implemented method can include: receiving a database instruction; identifying at least one action and at least one partition key from the database instruction; building, in response to the at least one partition key, a tablespace to attach first partitioned data to a table of the database when the at least one action includes an add partition instruction; identifying metrics from the table; comparing a first quantity of partitions to a second quantity of partitions to determine whether an operational requirement is satisfied; and detaching, in response to the at least one partition key, second partitioned data from the table when the at least one action includes a detach partition instruction and partition information of the metrics satisfies a partition quantity requirement of the table. Wherein if the operational requirement is satisfied, then the system can support the at least one partition key. Wherein the database instruction can comprise single-key information. Wherein the program steps can further comprise: obtaining a member list of the table; determining a range for the single key information; and generating statements to alter the table based on the member list and the range. Wherein the range can comprise date information such as a year, a month, a week, a day, and an hour. Wherein the database instruction can comprise multi-key information, wherein the program steps can further comprise: obtaining a member list of the table; determining a key pattern of the table and a range for the single key information; and generating statements to alter the table based on the member list and the range. Wherein the range can comprise date information such as a year, a month, a week, a day, and an hour. Wherein the program steps can further comprise generating a retention object when the at least one action includes a retain partition instruction; and adding the second partitioned data to another table to retain the second partitioned data. Wherein the program steps can further comprise deleting the second partitioned data from the database when the second partitioned data reaches a time limit.

In another embodiment, a method for dynamically partitioning and managing data at the partition level can include: generating a first partition having data related to a first category; generating a second partition having data related to a second category; controlling operations via a configuration file that identifies one or more partitions and one or more rules; and processing a subset of the first partition data according to the rules in the configuration file. Wherein the method can further include dynamically generating SQL statements for attach and detach operations based on the configuration file. Wherein the method can further include automatically detaching and dropping partitions based on the rules in the configuration file. Wherein the rules can relate to the first or second category. Wherein the first category can be a first time frame and the second category can be a second timeframe. Wherein a first rule can transfer data from the first partition to the second partition.

BRIEF DESCRIPTION OF THE DRAWINGS

The present disclosure will be readily understood by the following detailed description, taken in conjunction with the accompanying drawings that illustrate, by way of example, the principles of the present disclosure. The drawings illustrate the design and utility of one or more exemplary embodiments of the present disclosure, in which like elements are referred to by like reference numbers or symbols. The objects and elements in the drawings are not necessarily drawn to scale, proportion, or precise positional relationship. Instead, emphasis is focused on illustrating the principles of the present disclosure.

DETAILED DESCRIPTION

The disclosure presented in the following written description and the various features and advantageous details thereof, are explained more fully with reference to the non-limiting examples included in the accompanying drawings and as detailed in the description, which follow. Descriptions of well-known components have been omitted so to not unnecessarily obscure the principal features described herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can visualize or recognize the members of the genus. Accordingly, these examples should not be construed as limiting the scope of the claims.

Figure 1:
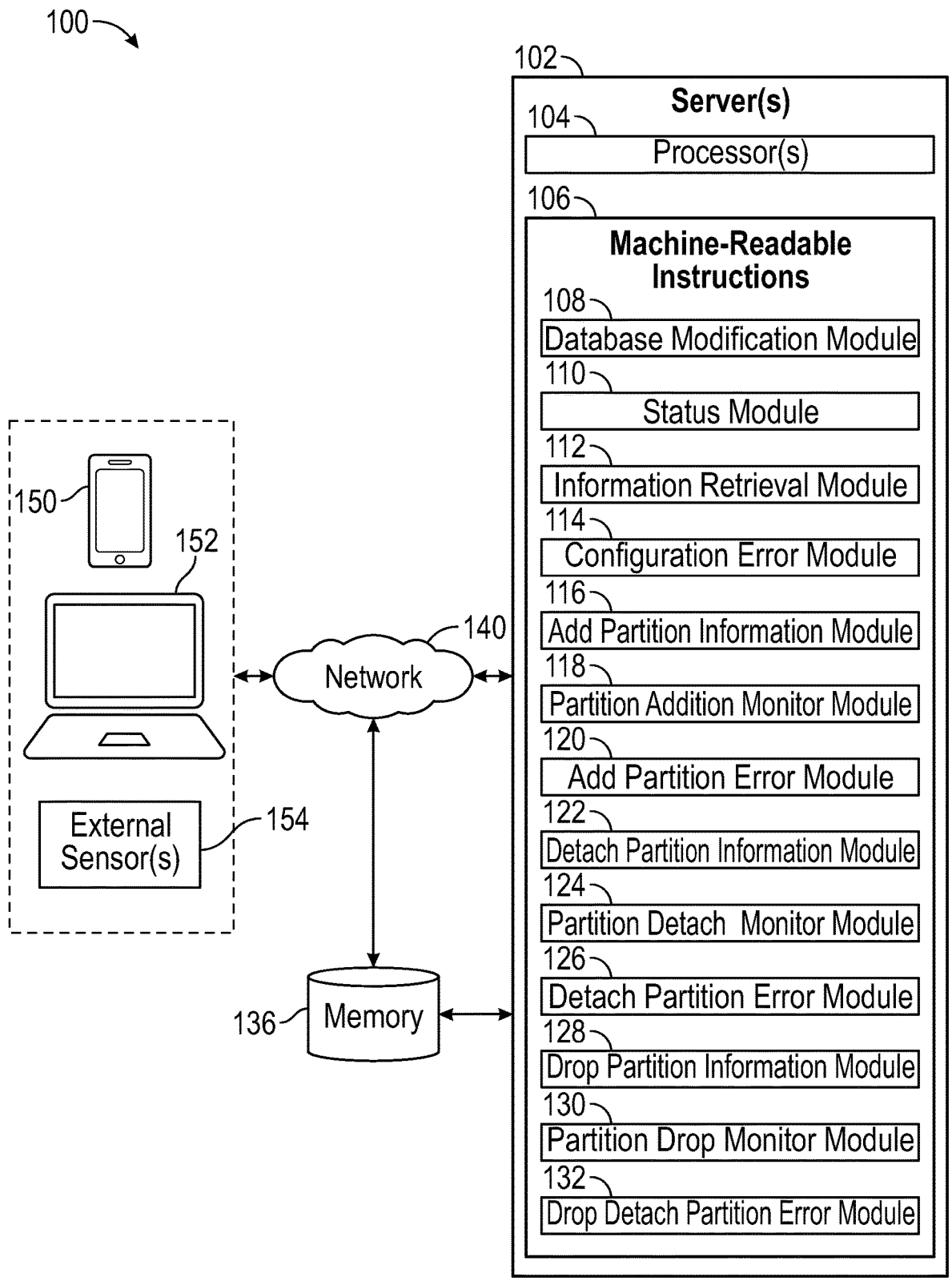
FIG. 1 illustrates a data lifecycle management system, in accordance with one or more exemplary embodiments of the present disclosure.

FIG. 1 illustrates a schematic view of a data lifecycle management system 100, in accordance with one or more exemplary embodiments of the present disclosure. The system 100 can include one or more servers 102 having one or more processors 104, a memory 130, machine readable instructions 106, including a database modification module 108, status module 110, information retrieval module 112, configuration module 114, add partition information module 116, partition addition monitor module 118, detach partition information module 120, partition detach monitor module 122, detach partition error module 124, drop partition information module 126, partition drop monitor module 128, and drop detach partition error module 130, among other relevant modules. The server 102 can be operably coupled to one or more clients via a network 140. The clients can be a physical device (e.g., mobile phone 150, laptop 152, external sensors 154, desktop computer, wearable device, or other suitable device), program, or application. In another embodiment, a client can include a mobile phone 150 having a mobile application configured to communicate with the server 102 over the network 140. In another embodiment, external sensors can include edge network components, IoT devices, or other suitable devices.

The aforementioned system components (e.g., server(s) 102 and client(s) 150, 152, 154, 156, etc.) can be communicably coupled to each other via the network 140, such that data can be transmitted. The network 140 can be the Internet, intranet, or other suitable network. The data transmission can be encrypted, unencrypted, over a VPN tunnel, or other suitable communication means. The network 140 can be a WAN, LAN, PAN, mesh, or other suitable network type. The network communication between the clients, server 102, or any other system component can be encrypted using PGP, Blowfish, Twofish, AES, 3DES, HTTPS, or other suitable encryption. The system 100 can be configured to provide communication via the various systems, components, and modules disclosed herein via an application programming interface (API), PCI, PCI-Express, ANSI-X12, Ethernet, Wi-Fi, Bluetooth, fiber, ZigBee®, Z-Wave®, Thread®, or other suitable communication protocol or medium. Additionally, third party systems and databases can be operably coupled to the system components via the network 140.

The data transmitted to and from the components of system 100 (e.g., the server 102 and clients), can include any format, including JavaScript Object Notation (JSON), TCP/IP, XML, HTML, ASCII, SMS, CSV, SQL, representational state transfer (REST), or other suitable format. The data transmission can include a message, flag, header, header properties, metadata, and/or a body, or be encapsulated and packetized by any suitable format having same.

The server(s) 102 can be implemented in hardware, software, or a suitable combination of hardware and software therefor, and may comprise one or more software systems operating on one or more servers, having one or more processors 104, with access to memory 130. Server(s) 102 can include electronic storage, one or more processors, and/or other components. Server(s) 102 can include communication lines, connections, and/or ports to enable the exchange of information via a network 140 and/or other computing platforms. Server(s) 102 can also include a plurality of hardware, software, and/or firmware components operating together to provide the functionality attributed herein to server(s) 102. For example, server(s) 102 can be implemented by a cloud of computing platforms operating together as server(s) 102, including Software-as-a-Service (SaaS) and Platform-as-a-Service (PaaS) functionality. Additionally, the server(s) 102 can include memory 130.

Memory 130 can comprise electronic storage that can include non-transitory storage media that electronically stores information. The electronic storage media of electronic storage can include one or both of system storage that can be provided integrally (e.g., substantially non-removable) with server(s) 102 and/or removable storage that can be removably connectable to server(s) 102 via, for example, a port (e.g., a USB port, a firewire port, etc.) or a drive (e.g., a disk drive, etc.). Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage may include one or more virtual storage resources (e.g., cloud storage, a virtual private network, and/or other virtual storage resources). The electronic storage can include a database, or public or private distributed ledger (e.g., blockchain). The electronic storage can include DB2, ORACLE, SQL, and POSTGRESQL databases, among others. Electronic storage can store machine-readable instructions 106, software algorithms, control logic, data generated by processor(s), data received from server(s), data received from computing platform(s), and/or other data that can enable server(s) to function as described herein. The electronic storage can also include third-party databases accessible via the network 140.

Processor(s) 104 can be configured to provide data processing capabilities in server(s) 102. As such, processor(s) 104 can include one or more of a digital processor, an analog processor, a digital circuit designed to process information, an analog circuit designed to process information, a state machine, and/or other mechanisms for electronically processing information, such as FPGAs or ASICs. The processor(s) 104 can be a single entity or include a plurality of processing units. These processing units can be physically located within the same device, or processor(s) 104 can represent processing functionality of a plurality of devices or software functionality operating alone, or in concert. A networked computer processor can be a processor 104 operably coupled to the network 140. The networked computer processor can be operably coupled to other processors, databases, or components.

The processor(s) 104 can be configured to execute machine-readable instructions 106 or machine learning modules via software, hardware, firmware, some combination of software, hardware, and/or firmware, and/or other mechanisms for configuring processing capabilities on processor(s) 104. As used herein, the term "machine-readable instructions" can refer to any component or set of components that perform the functionality attributed to the machine-readable instructions component 106. This can include one or more physical processors 104 during execution of processor-readable instructions, the processor-readable instructions, circuitry, hardware, storage media, or any other components.

The server(s) 102 can be configured with machine-readable instructions having one or more functional modules. The machine-readable instructions 106 can be implemented on one or more servers 102, having one or more processors 104, with access to memory 130. The machine-readable instructions 106 can be a single networked node, or a machine cluster, which can include a distributed architecture of a plurality of networked nodes. The machine-readable instructions 106 can include control logic for implementing various functionality, as described in more detail below. The machine-readable instructions 106 can include certain functionality associated with the STAMP system 100. Additionally, the machine-readable instructions 106 can include a smart contract or multi-signature contract that can process, read, and write data to the database, distributed ledger, or blockchain. The blockchain system can be a Bitcoin SV, Ethereum, BigchainDB, nChain, or other suitable blockchain system.

Figure 2:
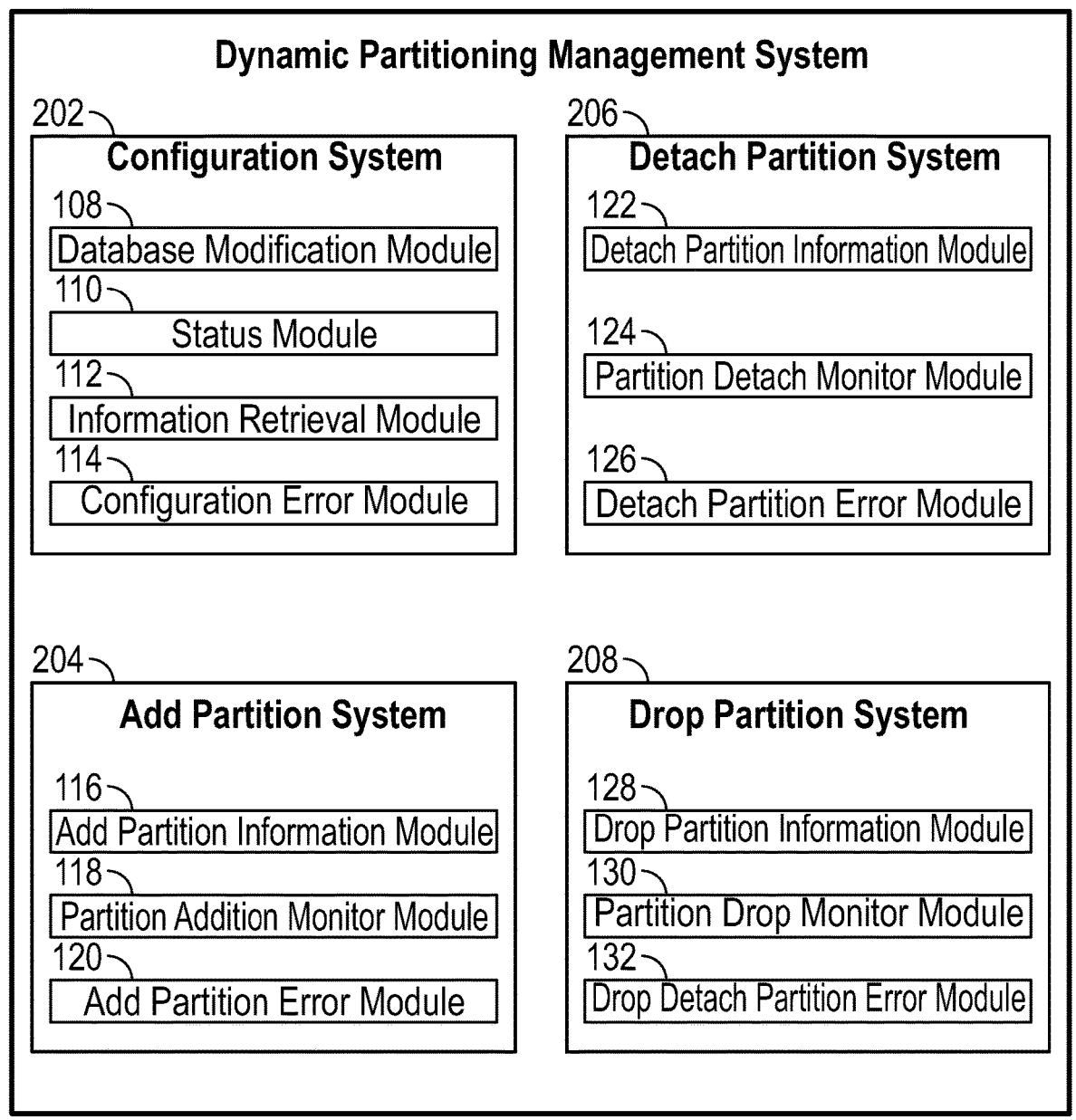
FIG. 2 illustrates a block diagram of a data lifecycle management system, in accordance with one or more exemplary embodiments of the present disclosure.

FIG. 2 illustrates a schematic view of a dynamic partitioning management system 200, in accordance with one or more exemplary embodiments of the present disclosure. The dynamic partitioning management system 200 can include a configuration system 202, an add partition system, 204, a detach partition system 206, and a drop partition system. Although certain exemplary embodiments may be directed to rail assets, the dynamic partitioning management system 200 can be used to manage data lifecycles for various types of data such as quality management systems and railroad management systems.

In one embodiment, the configuration system 202 can include database modification module 108, status module 110, information retrieval module 112, and configuration error module 114. The database modification module 108, status module 110, information retrieval module 112, and configuration error module 114 can implement one or more algorithms to facilitate data lifecycle management for various systems, including status, selection, and authentication algorithms. The algorithms and their associated thresholds and/or signatures can be programmable to suit a particular management system, application, function, facility, or other requirement. The configuration system 202 can be configured to retrieve and modify data related to a quality management system, railroad management system, or other suitable activity, to and from the client or server. In another embodiment, the configuration system 202 can generate one or more elements for display on the user device. The elements can provide additional information to the user related to the status of data lifecycle management. For example, notifications can be generated by the configuration system 202 and displayed on the client to indicate partition addition, detachment, deletion, errors, or other suitable information. Additionally, system symbols can be displayed on the client to indicate task, inspection, or plan status.

The database modification module 108 can enable management of a database based on one or more instructions. In one embodiment, the particular instructions can be found in a configuration file. For example, the configuration file can include or more parameters, instructions, or conditions. In another embodiment, the database modification module 108 can initialize any modification to be made to the database. For example, the database modification module 108 can execute operations when a user instructs the dynamic partition management system 200 to attach data to a data object within the database. In another embodiment, the database modification module 108 can dynamically modify the database based on a user input. For example, the user input can include a number of data rows to keep or remove, a member number indicating whether the data is part of a cluster of data structures, or a number of partitions to be retained, among other relevant input.

In one embodiment, the status module 110 can list data stored on the client or server for a particular user. In another embodiment, the status module 110 can indicate the status of one or entries stored on the client or server for a particular user. For example, an inspection stored on the client or server can be displayed on the client and labeled with its status (e.g., "in progress," "completed," or "to be completed") on a dashboard page of the client. In another embodiment, the status module 110 can display a notification on the client of a status change or a new requirement (e.g., new or re-inspection, capital plan generation, approval request, change request, etc.).

The information retrieval module 112 can extract data from a database. For example, the extraction can be based on a number of various partitions such as the date range of the data, the member group of the data, the tablespace of the data, among other partition factors. In another embodiment, the information retrieval module 112 can download specific data based on a request received from a user. For example, if a user requests data from a specified time and date range, then the information retrieval module 112 can obtain the data relating to the specified time and data range. In another embodiment, the information retrieval module 112 can initiate an action by calling or instantiating one or more modules on the server or client.

The configuration error module 114 can notify a user of an error based on failed configuration initialization. In one embodiment, the configuration error module 114 can prompt the user when no input parameters are included at execution of an instruction or when an incorrect input parameter is included at the execution of the instruction. In another embodiment, the configuration error module 114 can authenticate the user on a client, such as a mobile phone 150, laptop 152, tablet, wearable device, or other suitable device. In one embodiment, the configuration error module 114 can authenticate the user or session using a username, password, authentication token, biometric, or other suitable attribute received from the client.

In another embodiment, the configuration error module 114 can generate an authentication token for a particular user, session, or request. In one embodiment, the configuration error module 114 can generate an authentication token using user data stored in the client. For example, a user can access a client and/or the dynamic partition management system 200 by providing valid credentials via a login page or screen, including a username and password, biometrics, multi-factor authentication, or other suitable credential, such credentials, along with a user's information such as name, username, employee number, etc., can be stored in the client or server. In another embodiment, the configuration error module 114 can process at least a portion of the credentials and/or user information to generate an authentication token. For example, the authentication token can be generated as a JSON Web Token (JWT), via dongles or key fobs that can periodically generate a new authentication token in accordance with a known algorithm, using an authenticator app on the client or sent on demand via SMS, by hashing at least a portion of the login credentials, or other suitable methodology. In another embodiment, the authentication token can allow for single sign-on authentication to the server and/or memory from the client.

In one embodiment, the add partition system 204 can include add partition information module 116, partition addition monitor module 118, and add partition error module 120. The add partition information module 116, partition addition monitor module 118, and add partition error module 120 can implement one or more algorithms to facilitate data lifecycle management and add data related to various systems, including a data attach, attach monitoring, and finalization algorithm. The algorithms and their associated thresholds and/or signatures can be programmable to suit a particular quality management system, application, function, facility, or other requirement. The add partition system 204 can be configured to send and receive messages related to data lifecycle management or other suitable activity, to and from the client or server. In another embodiment, the add partition system 204 can generate one or more elements for display on the user device. The elements can provide additional information to the user related to data lifecycle management. For example, notifications can be generated by the add partition system 204 and displayed on the client to indicate data attachment, attach completion, attach monitoring, attach error, or other suitable information. Additionally, system symbols can be displayed on the client to indicate management status.

In one embodiment, the add partition information module 116 can initialize a configuration file and determines whether required file systems are accessible. For example, if the required file systems are accessible, the add partition information module 116 initializes variables used in execution of adding data to the database. In another embodiment, the add partition information module 116 can establish a connection to the database. In another embodiment, the add partition information module 116 can collect metric data about cluster members of the database. For example, cluster members of the database are particular groups of data structures with assigned identification providing the add partition system 204 with information regarding the identifications of the data structures. The add partition information module 116 can also provide a user interface for modifying the administrative portion of the add partition system 204, including algorithms and thresholds. The dynamic partitioning management system 200 can utilize the add partition information module 116 to provide a user interface for obtaining data for attaching to the database related to any element of the data lifecycle management system 102.

In one embodiment, the partition addition monitor module 118 can read and parse operations from a configuration file. For example, the operations can include an operation to add data to a data object. In another embodiment, the partition addition monitor module 118 can collect metrics to determine the number of partitions, tables, and jobs scheduled to be run and created. For example, the partitions include factors such as time and date that are used to indicate to the partition addition monitor module 118 how to parse the records. The partition addition monitor module 118 later uses the metrics to verify the tables were created and jobs were executed. Advantageously, the partition addition monitor module 118 can generate data structures based on three key pattern groups defined for each partition. For example, the key pattern groups are used to identify which group each partition key belongs. The groups can include a member value indicating whether the data being added belongs to a particular group, a date indicating the date range to include the data, and a group indicating the particular group for attaching the data. For example, the member value can be a binary value indicating whether the partition is in a particular cluster of data objects. Alternatively, the member value can be a value indicating whether the cluster of data objects to which the partition belongs.

For example, during an add data operation, initially processing the key pattern identifies whether the partition addition monitor module 118 can execute based on the key pattern. The three key pattern groups are identified, and if any of the key pattern groups are invalid, then the partition addition monitor module 118 enables the add partition error module 120 to notify the user. The partition addition monitor module 118 determines whether the key pattern is a single key or a multi-key. In one embodiment, the partition addition monitor module 118 executes building of a table space followed by either single-key instructions or multi-key instructions.

In one embodiment, the partition addition monitor module 118 can generate a tablespace for the database to store the partitions. In another embodiment, the partition addition monitor module 118 can determine the number of current partitions in a table and determine whether the table includes a maximum number of partitions. In another embodiment, the partition addition monitor module 118 can identify a number of members of a target database based on the key pattern group and member values. In another embodiment, the partition addition monitor module 118 can generate tablespace structures for each key pattern identifying a current tablespace structure, next tablespace structure, minimum tablespace structure, and maximum tablespace structure. In another embodiment, the partition addition monitor module 118 can write "create tablespace" statements using a template constructor.

In another embodiment, when the key pattern is a single key, the partition addition monitor module 118 can generate executable statements to add partitions to a table. In another embodiment, the single key can be organized by time. For example, the time can be a particular time or a range of an extendable time. In one embodiment, the partition addition monitor module 118 can generate partitions for data before the data is added to the table. For example, when the partition is for a particular week, the range for the partition can be executed before the particular week ends. In another embodiment, the partition addition monitor module 118 can obtain a member list including clusters of the database. In another embodiment, the partition addition monitor module 118 can determine a range for the single key, such as year, month, week, day, hour, or another value. In another embodiment, the partition addition monitor module 118 can generate "alter" statements for data table manipulation and write the alter statements to files for execution at a later time. In another embodiment, the partition addition monitor module 118 can generate a unique batch job for each table to be run at a predetermined time.

In another embodiment, when the key pattern is a multi-key, the partition addition monitor module 118 can generate executable statements to add partitions to a table. The single key is organized by a range of an extendable time. The partition addition monitor module 118 generates partitions for data before the data is added to the table. For example, when the partition is for a particular week, the range for the partition is executed before the particular week ends. In another embodiment, the partition addition monitor module 118 can obtain a member list including clusters of the database. In another embodiment, the partition addition monitor module 118 can determine a range for the single key, such as year, month, week, day, hour, or another value. In another embodiment, the partition addition monitor module 118 can determine the structure of the key pattern group to identify multiple values for the partition keys. For example, the key pattern group includes a date time range and a member group value to identify the data to be added is included in a particular member cluster. In another embodiment, the partition addition monitor module 118 can generate alter statements for data table manipulation and write the alter statements to at least one file for execution by another system. In another embodiment, the partition addition monitor module 118 can generate a unique batch job for each table to be run by another system.

In another embodiment, the partition addition monitor module 118 can execute multiple jobs in parallel allowing for various table additions simultaneously. The partition addition monitor module 118 can execute each job and monitor each job independently. For example, the partition addition monitor module 118 obtains information regarding the number of jobs to be executed, the number of tablespaces to create, the number of jobs yet to be executed, among other information relevant to processing the added data. In another embodiment, the partition addition monitor module 118 can terminate the connection to the database.

In one embodiment, the add partition error module 120 can notify a user of any errors occurring while adding data to the database. For example, the add partition error module 120 obtains a plurality of logs indicating errors during runtime of the data partitioning management system 200. In one embodiment, the add partition error module 120 can generate an output and distribute a notification to users based on a user list.

In one embodiment, the detach partition system 206 can include detach partition information module 122, partition detach monitor module 124, and detach partition error module 126. The include detach partition information module 122, partition detach monitor module 124, and detach partition error module 126 can implement one or more algorithms to facilitate data lifecycle management and detach data from various systems, including a data detach, data detach monitor, and data detach error algorithm. The algorithms and their associated thresholds and/or signatures can be programmable to suit a particular quality management system, application, function, facility, or other requirement. The detach partition system 206 can be configured to send and receive messages related to data lifecycle management or other suitable activity, to and from the client or server. In another embodiment, the detach partition system 206 can generate one or more elements for display on the user device. The elements can provide additional information to the user related to data lifecycle management. For example, notification can be generated by the detach partition system 206 and displayed on the client to indicate data detachment, detach completion, detach monitoring, detach error, or other suitable information. Additionally, system symbols can be displayed on the client to indicate management status.

In one embodiment, the detach partition information module 122 can initialize a configuration file and determines whether required file systems are accessible. For example, if the required file systems are accessible, the detach partition information module 122 initializes variables used in execution of adding data to the database. In another embodiment, the detach partition information module 122 can establish a connection to the database. In another embodiment, the detach partition information module 122 collects metric data about cluster members of the database. For example, cluster members of the database are particular groups of data structures with assigned identification providing the detach partition system 206 with information regarding the identifications of the data structures. The detach partition information module 122 can also provide a user interface for modifying the administrative portion of the detach partition system 206, including algorithms and thresholds. The dynamic partitioning management system 200 can utilize the detach partition information module 122 to provide a user interface for obtaining data for attaching to the database related to any element of the data lifecycle management system 102.

In one embodiment, the partition detach monitor module 124 can read and parse operations from a configuration file. For example, the operations can include an operation to add data to a data object. In another embodiment, the partition detach monitor module 124 can collect metrics to determine the number of partitions, tables, and jobs scheduled to be run and created. For example, the partitions include factors such as time and date that are used to indicate to the partition detach monitor module 124 how to parse the records. The partition detach monitor module 124 later uses the metrics to verify the tables were created and jobs were executed. In another embodiment, the partition detach monitor module 124 can identify data structures based on three key pattern groups defined for each partition. For example, the key pattern groups are used to identify which group each partition key belongs. The groups can include member indicating whether the data being added belongs to a particular group, date indicating the date range to include the data, and group indicating the particular group for detaching the data.

For example, during a detach operation, initially processing the key pattern identifies whether the partition detach monitor module 124 can execute the key pattern. The three key pattern groups can be identified, and if any of the key pattern groups are invalid, then the partition detach monitor module 124 can enable the detach partition error module 126 to generate a notification that can be transmitted to the user. The partition detach monitor module 124 can determine whether the key pattern is a single key or a multi-key. In another embodiment, the partition detach monitor module 124 can identify whether to attach the detached data to an existing table or to a new table. In another embodiment, the partition detach monitor module 124 can generate a table space following either single key instructions or multi-key instructions.

In another embodiment, the partition detach monitor module 124 indexes table objects by defining global indexes, table constraints, and table triggers. For example, when a table includes the aforementioned objects, the partition detach monitor module 124 identifies the table objects and disables the table object prior to a detach command is executed. After the detach command is complete, the table objects are enabled again. In another embodiment, the partition detach monitor module 124 can generate a file including instructions to properly detach a partition and restore the table objects to the normal state. In another embodiment, the partition detach monitor module 124 can execute multiple jobs in parallel allowing for various table additions simultaneously. The partition detach monitor module 124 can execute each job and monitor each job independently. For example, the partition detach monitor module 124 obtains information regarding the number of jobs to be executed, the number of tablespaces to create, the number of jobs yet to be executed, among other information relevant to processing the added data. In another embodiment, the partition detach monitor module 124 can terminate the connection to the database.

In one embodiment, the detach partition error module 126 can notify a user of any errors occurring while detaching data from the database. For example, the detach partition error module 126 obtains a plurality of logs indicating errors during runtime of the data partitioning management system 200. In one embodiment, the detach partition error module 126 can generate an output and distribute a notification to users based on a user list.

In one embodiment, the drop partition system 208 can include drop partition information module 128, partition drop monitor module 130, and drop partition error module 132. The drop partition information module 128, partition drop monitor module 130, and drop partition error module 132 can implement one or more algorithms to facilitate data lifecycle management and delete data from various systems, including a data delete, data delete monitor, and data delete error algorithm. The algorithms and their associated thresholds and/or signatures can be programmable to suit a particular quality management system, application, function, facility, or other requirement. The drop partition system 208 can be configured to send and receive messages related to data lifecycle management or other suitable activity, to and from the client or server. In another embodiment, the drop partition system 208 can generate one or more elements for display on the user device. The elements can provide additional information to the user related to data lifecycle management. For example, notification can be generated by the drop partition system 208 and displayed on the client to indicate data deletion, delete completion, delete monitoring, delete error, or other suitable information. Additionally, system symbols can be displayed on the client to indicate management status.

In one embodiment, the drop partition information module 128 can initialize a configuration file and determines whether required file systems are accessible. For example, if the required file systems are accessible, the drop partition information module 128 initializes variables used in execution of adding data to the database. In another embodiment, the drop partition information module 128 can establish a connection to the database. In another embodiment, the drop partition information module 128 collects metric data about cluster members of the database. For example, cluster members of the database are particular groups of data structures with assigned identification providing the drop partition system 208 with information regarding the identifications of the data structures. The drop partition information module 128 can also provide a user interface for modifying the administrative portion of the drop partition system 208, including algorithms and thresholds. The dynamic partitioning management system 200 can utilize the drop partition information module 128 to provide a user interface for obtaining data for attaching to the database related to any element of the data lifecycle management system 102.

In one embodiment, the partition drop monitor module 130 can receive tables to drop based on an detached table instruction. For example, the partition detach monitor module 124 identifies which data to detach and transmits the identification of the detached data to the partition drop monitor module 130 to delete the detached data. In another embodiment, the partition drop monitor module 130 can generate a job to delete the detached data from the database. In another embodiment, the partition drop monitor module 130 executes the job to delete the detached data and deletes the detached data from the database.

In one embodiment, the drop partition error module 132 can notify a user of any errors occurring while deleting data from the database. For example, the drop partition error module 132 obtains a plurality of logs indicating errors during runtime of the data partitioning management system 200. In one embodiment, the drop partition error module 132 can generate an output and distribute a notification to users based on a user list.

In operation, the dynamic partitioning management system 200 can incorporate one or more thresholds to determine whether the system 200 attaches, detaches, or drops segments of data based on key partitions of the data objects to optimize database utilization. This adaptive thresholding can alter one or more characteristics of the database. Additionally, the thresholds can be adaptive as the thresholding can change based upon the historical data, data type, timestamp, or other relevant data. In one embodiment, for example, a plurality of train events can be stored in a database as they occur. A first partition can be named "Today" and a second partition can be named "Tomorrow." So as train events occur, that data can be written into the Today partition. Once the train events meet a particular threshold identified in a configuration file, such as the date changing at midnight (e.g., at midnight the date changes to the subsequent day), the train events can be written to the Tomorrow partition, and the Today partition will no longer be updated or written to. The Tomorrow partition will be the one receiving all the information.

In another embodiment, by way of further example, for a particular train event structure a user can request only Tomorrow and Today data, so once Tomorrow data starts getting written to the Today partition, the system 200 may migrate data writing to another partition by dynamically picking that partition called by a particular day of the week (e.g., based on the configuration file settings). In this way, the data from today can be moved to Wednesday under train events for the week, so then train events for the week would have data from partitions Monday, Tuesday, and Wednesday dynamically attached. If the system were to query train events for the week, the system 200 could retrieve Wednesday's data automatically without any disruption in, for example, under 5 seconds. The system 200 could then copy the train events over and call the partition week 23 or it could move one day at a time over and keep appending the data to week 22 until week 22 ends and then it would be week 23 so the history events could just keep growing.

In another exemplary embodiment, the system 200 can provide adaptive thresholding of time-related criteria based on changes in timestamp or other relevant information. In another exemplary embodiment, the system 200 can provide adaptive thresholding of time-related criteria based on data type or other relevant information. In another exemplary embodiment, the system 200 can save the adapted thresholds in the database for a particular model. The system 200 can determine whether the timestamp of an entry meets or surpasses a first threshold. The system 200 can compare, via the server, the timestamp for a data entry with the first threshold to determine whether the threshold is surpassed. For example, the threshold may be a time duration, such as 24 hours from the last transaction, or other relevant metric. The system 200 can include a feedback loop such that the thresholds can be modified using other information. For example, the system 200 can calculate the differences, standard deviation, average, interpolation, or other data analysis, on the information to set or modify the thresholds.

Figure 3:
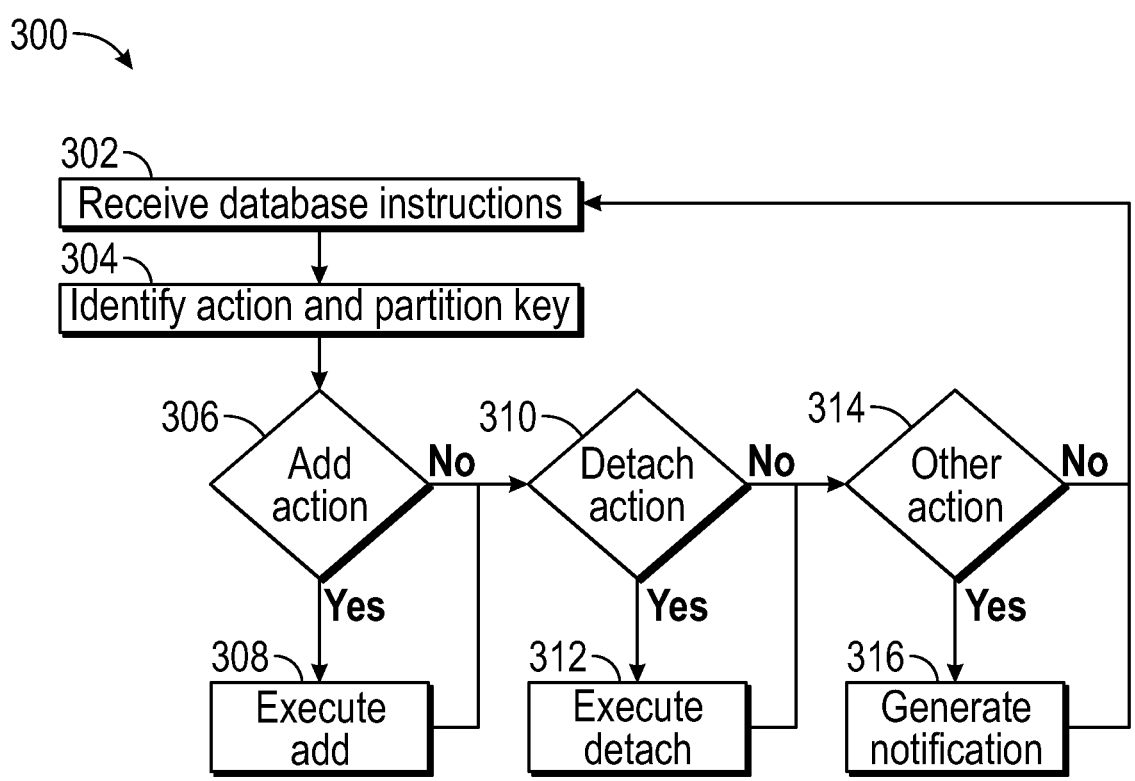
FIG. 3 illustrates a flowchart exemplifying data lifecycle management control logic, in accordance with one or more exemplary embodiments of the present disclosure.

FIG. 3 illustrates a flowchart exemplifying data lifecycle management control logic 300, in accordance with one or more exemplary embodiments of the present disclosure. The data lifecycle management control logic 300 can be implemented as an algorithm on a server 204, a machine learning module, a client, a database, or other suitable system. Additionally, the data lifecycle management control logic 300 can implement or incorporate one or more features of the configuration system 202, including database modification module 108, status module 110, information retrieval module 112, and configuration error module 114. The data lifecycle management control logic 300 can be achieved with software, hardware, an application programming interface (API), a network connection, a network transfer protocol, HTML, DHTML, JavaScript, Dojo, Ruby, Rails, other suitable applications, or other suitable combinations thereof.

The data lifecycle management control logic 300 can leverage the ability of a computer platform to spawn multiple processes and threads by processing data simultaneously. The speed and efficiency of the data lifecycle management control logic 300 can be greatly improved by instantiating more than one process to implement data lifecycle management. However, one skilled in the art of programming will appreciate that use of a single processing thread may also be utilized and is within the scope of the present disclosure.

At step 302, the control logic 300 can receive database instructions. In one embodiment, the control logic 300 can display instructions on a client. In another embodiment, the control logic 300 receives user input instructions. In another embodiment, the control logic 300 receives instructions from an electronic file. The control logic 300 proceeds to step 304.

At step 304, the control logic 300 can identify an action from the instructions and at least one partition key. For example, the action can be an add partitioned data action or a detach partitioned data action. In another embodiment, the at least one partition key can include a single key partition or a multi-key partition. For example, the single key partition can include one of a date, a member value, or a group value. Alternatively, the multi-key partition can include at least two of a date, a member value, or a group value. The at least one partition key can be used to identify a location in the database to attach or detach data. The control logic 300 proceeds to step 306.

At step 306, the control logic 300 can identify whether the action is an add action. In another embodiment, the control logic 300 compares the action with valid action types to identify whether the action type matches the add action. If the action type is the add action, the control logic 300 proceeds to step 308. If the track type is non-add, the control logic 300 proceeds to step 310.

Figure 4:
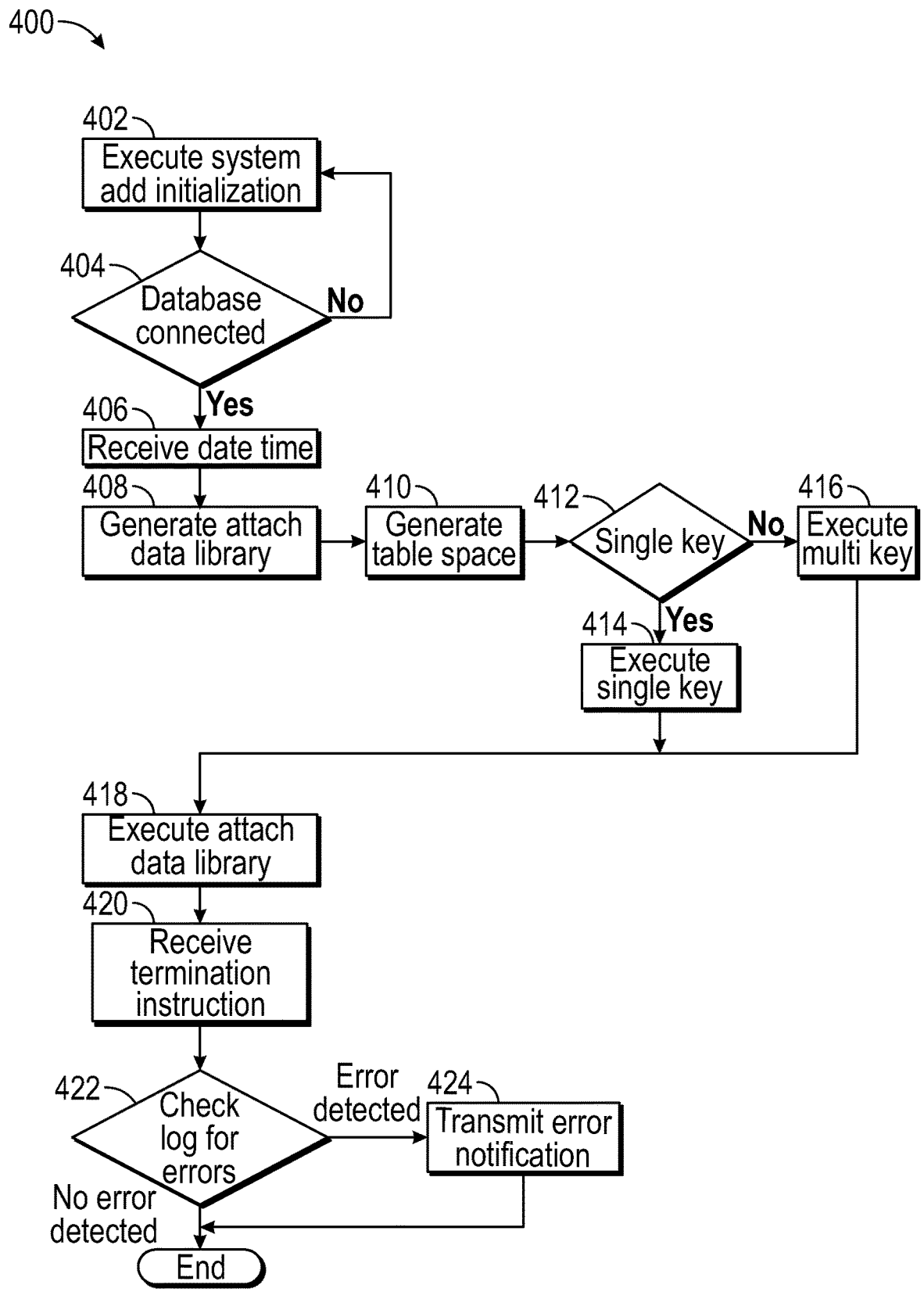
FIG. 4 illustrates a flowchart exemplifying attaching partitioned data control logic, in accordance with one or more exemplary embodiments of the present disclosure.

At step 308, the control logic 300 can execute an add function to attach data to a table, as described in more detail in FIG. 4.

At step 310, the control logic 300 can identify whether the action is a detach action. In another embodiment, the control logic 300 compares the action with valid action types to identify whether the action type matches the detach action. If the action type is the detach action, the control logic 300 proceeds to step 312. If the track type is non-add, the control logic 300 proceeds to step 314.

Figure 5:
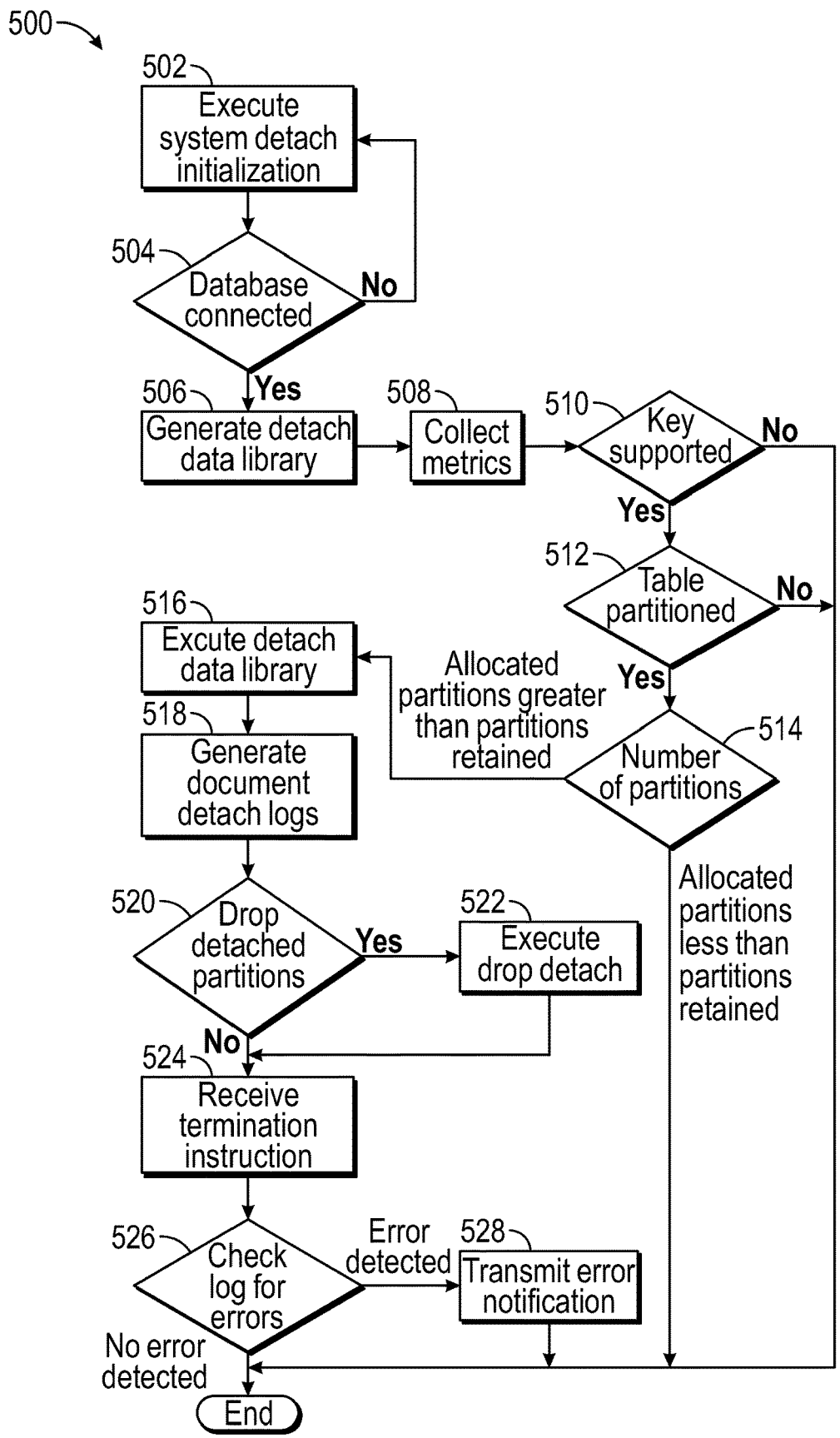
FIG. 5 illustrates a flowchart exemplifying detaching partitioned data control logic, in accordance with one or more exemplary embodiments of the present disclosure.

At step 312, the control logic 300 can execute a detach function to attach data to a table, as described in more detail in FIG. 5.

At step 314, the control logic 300 can identify whether the action is an invalid action. In another embodiment, the control logic 300 compares the action with valid action types to identify whether the action type matches any of the valid action types. If the action type is invalid, the control logic 300 proceeds to step 302. If the track type is valid, the control logic 300 proceeds to step 316.

At step 316, the control logic 300 can generate a notification indicating an occurrence of an error. In another embodiment, the control logic 300 can notify all users on a user list. For example, the control logic 300 can generate an error message and send an email to all users on a listserv.

FIG. 4 illustrates a flowchart exemplifying attaching partitioned data control logic 400, in accordance with one or more exemplary embodiments of the present disclosure. The attaching partitioned data control logic 400 can be implemented as an algorithm on a server 102, a machine learning module, a client, a database, or other suitable system. Additionally, the attaching partitioned data control logic 400 can implement or incorporate one or more features of the add partition system 204, including add partition information module 116, partition addition monitor module 118, and add partition error module 120. The attaching partitioned data control logic 400 can be achieved with software, hardware, an API, a network connection, a network transfer protocol, HTML, DHTML, JavaScript, Dojo, Ruby, Rails, other suitable applications, or suitable combinations thereof.

The attaching partitioned data control logic 400 can leverage the ability of a computer platform to spawn multiple processes and threads by processing data simultaneously. The speed and efficiency of the attaching partitioned data control logic 400 can be greatly improved by instantiating more than one process to implement attaching partitioned data to a table in a database. However, one skilled in the art of programming will appreciate that use of a single processing thread may also be utilized and is within the scope of the present disclosure.

The attaching partitioned data control logic 400 of the present embodiment begins at step 308, where the attaching partitioned data control logic 400 can receive an add data partition instruction according to step 308 of FIG. 3. In one embodiment, commands or data can be received via user input generated on a client or server, such as a screen tap, swipe, mouse click, key press, voice command, or other suitable mechanism. In another embodiment, the inspection commands or data can include inspection data having one or more fields, parameters, characteristics, or metadata, related to an inspection. The attaching partitioned data control logic 400 then proceeds to step 402.

At step 402, the control logic 400 can execute system add initialization. In another embodiment, the control logic 400 can initialize a configuration file and determine whether required file systems are accessible. For example, if the required file systems are accessible, the control logic 400 can initialize variables used in executing add data operations to the database. The control logic 400 can also provide a user interface for modifying an administrative portion, including algorithms and thresholds. The control logic 400 proceeds to step 404.

At step 404, the control logic 400 can determine whether a database is connected. In another embodiment, the control logic 400 can execute from a remote server. In another embodiment, when a database is connected, the control logic 400 can collect metric data about cluster members of the database. For example, cluster members of the database are particular groups of data structures with assigned identification providing information regarding the identifications of the data structures. If the database is not connected, then the control logic 400 proceeds to step 402. If the database is connected, then the control logic 400 proceeds to step 406.

At step 406, the control logic 400 can receive a date time of a target table. In another embodiment, the control logic 400 can establish date time ranges and value to determine whether a partition already exists or can be created. In another embodiment, the control logic 400 can identify whether the table is at a capacity for partitions or is within a range for a particular partition. The control logic 400 proceeds to step 408.

At step 408, the control logic 400 can generate an attach data library. For example, the attach data library can include the data to attach based on an instruction from a user. The control logic 400 proceeds to step 410.

At step 410, the control logic 400 can generate a tablespace corresponding to the data to be attached. In another embodiment, the control logic 400 generates, in response to the at least one partition key, the tablespace to attach first partitioned data to a table of the database when the at least one action includes an add partition instruction. In another embodiment, the control logic 400 can determine the number of current partitions in a table and determine whether the table includes a maximum number of partitions. In another embodiment, the control logic 400 can determine a number of members of a target database based on the key pattern group and member values. In another embodiment, the control logic 400 can generate tablespace structures for each key pattern identifying a current tablespace structure, next tablespace structure, minimum tablespace structure, and maximum tablespace structure. In another embodiment, the control logic 400 can write create tablespace statements using a template generator. The control logic 400 proceeds to step 412.

At step 412, the control logic 400 can determine whether the data to be attached includes a single key partition or a multi-key partition. For example, the single key partition can include a single key pattern from a group of key patterns, such as a date, group value, or member value (e.g., a date range for the data attaching to the table, such as a year, month, week, day, hour, or some other measurement of time). Alternatively, the multi-key partition can include more than one of the key patterns. The control logic 400 proceeds to step 414.

Figure 7:
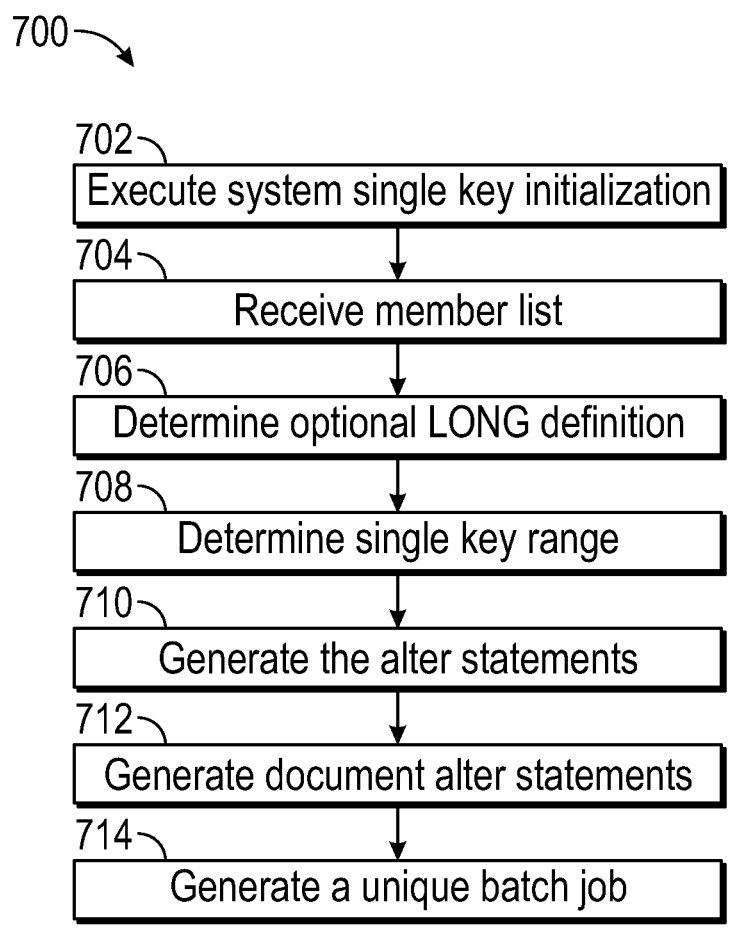
FIG. 7 illustrates a flowchart exemplifying single key partition control logic, in accordance with one or more exemplary embodiments of the present disclosure.

At step 414, the control logic 400 can execute a single key partition function to parse the data based on the single key partition, as described in more detail in FIG. 7.

Figure 8:
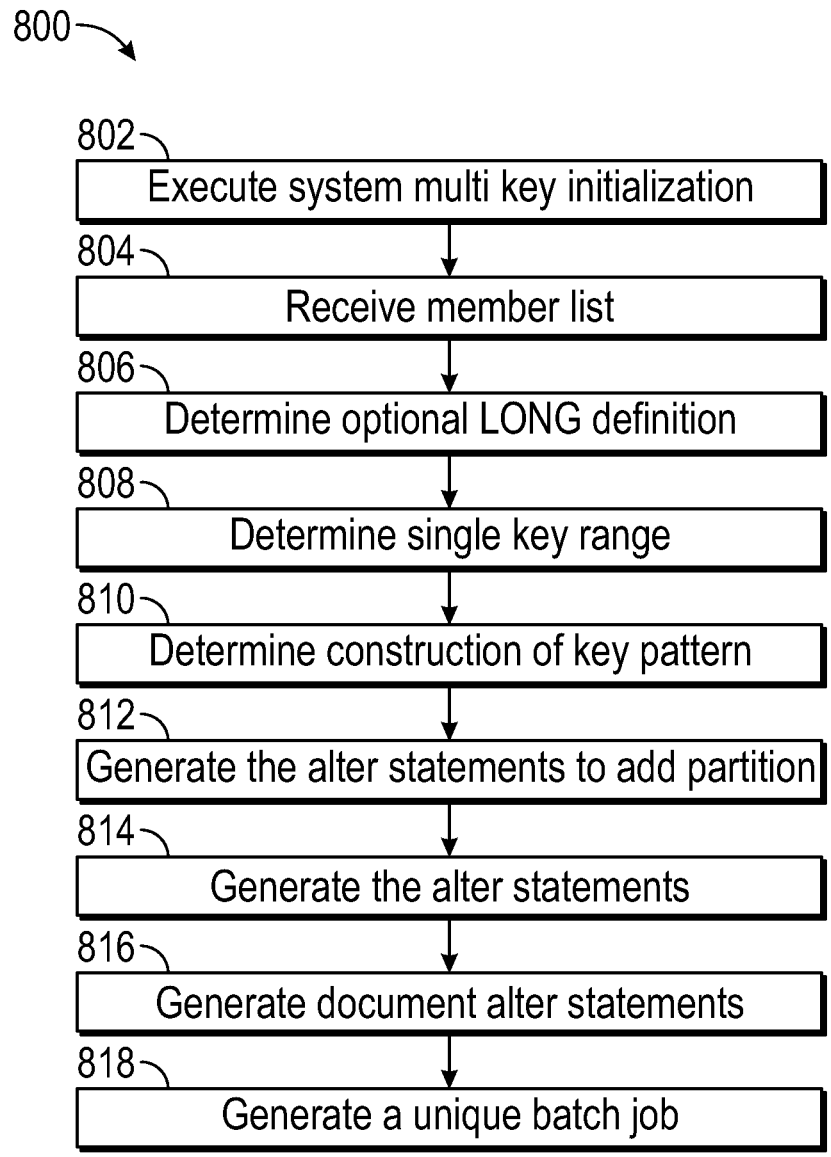
FIG. 8 illustrates a flowchart exemplifying multi-key partition control logic, in accordance with one or more exemplary embodiments of the present disclosure.

At step 416, the control logic 400 can execute a multi-key partition function to parse the data based on the multi-key partition, as described in more detail in FIG. 8.

At step 418, the control logic 400 can execute the attached data library. For example, the control logic 400 executes a plurality of jobs for the attached data library, such as adding the data to particular tables of the database. In another embodiment, the control logic 400 can execute the attached data library in a multithreaded environment allowing the jobs to be executed in parallel. In another embodiment, the control logic 400 can execute each job and monitor each job independently. For example, the control logic 400 can obtain information relevant to processing the added data and execute instructions corresponding to the foregoing information. The information can include regarding the number of jobs to be executed, the number of tablespaces to create, the number of jobs yet to be executed, among other information. The control logic 400 proceeds to step 420.

At step 420, the control logic 400 can receive termination instructions. For example, the termination instructions can include a user enabled instruction to force the control logic 400 to cease operations. The control logic 400 proceeds to step 422.

At step 422, the control logic 400 can determine whether an error exists in a plurality of logs. In another embodiment, the control logic 400 collects the logs to identify any errors. If an error is detected, then the control logic 400 proceeds to step 424. If an error is not detected, then the control logic 400 proceeds to terminate the instructions.

At step 424, the control logic 400 can transmit an error notification. In another embodiment, the control logic 400 can transmit the error notification to any user on a user list. For example, the control logic 400 can generate an error message and send an email to all users on a listserv. The control logic 400 proceeds to terminate the instructions.

FIG. 5 illustrates a flowchart exemplifying detaching partitioned data control logic 500, in accordance with one or more exemplary embodiments of the present disclosure. The detaching partitioned data control logic 500 can be implemented as an algorithm on a server 102, a machine learning module, a client, a database, or other suitable system. Additionally, the detaching partitioned data control logic 500 can implement or incorporate one or more features of the detach partition system 206, including detach partition information module 122, partition detach monitor module 124, and detach partition error module 126. The detaching partitioned data control logic 500 can be achieved with software, hardware, an API, a network connection, a network transfer protocol, HTML, DHTML, JavaScript, Dojo, Ruby, Rails, other suitable applications, or suitable combinations thereof.

The detaching partitioned data control logic 500 can leverage the ability of a computer platform to spawn multiple processes and threads by processing data simultaneously. The speed and efficiency of the detaching partitioned data control logic 500 can be greatly improved by instantiating more than one process to implement detaching partitioned data. However, one skilled in the art of programming will appreciate that use of a single processing thread may also be utilized and is within the scope of the present disclosure.

The detaching partitioned data control logic 500 of the present embodiment begins at step 312, where the detaching partitioned data control logic 500 can receive a detach data partition instruction according to step 312 of FIG. 3. In one embodiment, commands or data can be received via user input generated on a client or server, such as a screen tap, swipe, mouse click, key press, voice command, or other suitable mechanism. In another embodiment, the inspection commands or data can include inspection data having one or more fields, parameters, characteristics, or metadata, related to an inspection. The detaching partitioned data control logic 500 then proceeds to step 502.

At step 502, the control logic 500 can execute system detach initialization. In another embodiment, the control logic 500 can initialize a configuration file and determine whether required file systems are accessible. For example, if the required file systems are accessible, the control logic 500 can initialize variables used in executing detach data operations from the database. The control logic 500 can also provide a user interface for modifying an administrative portion, including algorithms and thresholds. The control logic 500 proceeds to step 504.

At step 504, the control logic 500 can determine whether a database is connected. In another embodiment, the control logic 500 can execute from a remote server. If the database is not connected, then the control logic 500 proceeds to step 502. If the database is connected, then the control logic 500 proceeds to step 506.

At step 506, the control logic 500 can generate a detach data library. For example, the detach data library can include the data to detach based on an instruction from a user. The control logic 500 proceeds to step 508.

At step 508, the control logic 500 can collect metrics about the data to detach. For example, cluster members of the database are particular groups of data structures with assigned identification providing information regarding the identifications of the data structures, when the data structures are to be removed, the instructions identify specific data structures using the identifications. The control logic 500 proceeds to step 510.

At step 510, the control logic 500 can determine whether a type of key is supported. In another embodiment, the control logic 500 determines the type of key that is supported based on one of a date, a group value, and a member value. If the type of key is not supported, then the control logic 500 terminates the process. If the type of key is supported, then the control logic 500 proceeds with step 512.

At step 512, the control logic 500 can determine whether a table is partitioned. In another embodiment, the control logic 500 determines the table is partitioned when the table is organized according to a predetermined structure. For example, the table is partitioned when columns of the table are organized based on an event code, an event type, a message, and a row identifier. If the table is not partitioned, then the control logic 500 terminates the process. If the table is partitioned, then the control logic 500 proceeds with step 514.

At step 514, the control logic 500 can determine whether a number of partitions is supported. In another embodiment, the number of partitions is supported when a number of allocated partitions is greater than a number of partitions retained. Alternatively, the number of partitions is not supported when the number of allocated partitions are less than the number of partitions retained. For example, the control logic 500 can identify a number of partitions based on the number of partitions retained, so when the number of partitions are larger than the number of partitions retained, the partitions are unsupportable. If the number of partitions is not supported, then the control logic 500 terminates the process. If the number of partitions is supported, then the control logic 500 proceeds with step 516.

At step 516, the control logic 500 can execute the detach library. For example, the control logic 500 executes a plurality of jobs for the attached data library, such as adding the data to particular tables of the database. In another embodiment, the control logic 500 can execute the attached data library in a multithreaded environment allowing the jobs to be executed in parallel. In another embodiment, the control logic 500 can execute each job and monitor each job independently. For example, the control logic 500 can obtain information relevant to processing the added data and execute instructions corresponding to the foregoing information. The information can include regarding the number of jobs to be executed, the number of tablespaces to create, the number of jobs yet to be executed, among other information. The control logic 500 proceeds to step 518.

At step 518, the control logic 500 can generate a document of detach logs. For example, the control logic 500 can generate documents including the detach logs for future use in another system, such as another UNIX system. In another embodiment, the control logic 500 can generate a file including instructions to properly detach a partition and restore the table objects to a normal state. The control logic 500 can index table objects by defining global indexes, table constraints, and table triggers. For example, when a table includes the aforementioned objects, the control logic can identify the table objects and disables the table object prior to a detach command is executed. After the detach command is complete, the table objects are enabled again.

At step 520, the control logic 500 can determine whether to drop the detached partitions. In another embodiment, the control logic 500 can identify when the detached data is unnecessary. If the detached partitions are not to be dropped, then the control logic 500 proceeds with step 524. If the detached partitions are to be dropped, then the control logic 500 proceeds with step 522.

Figure 6:
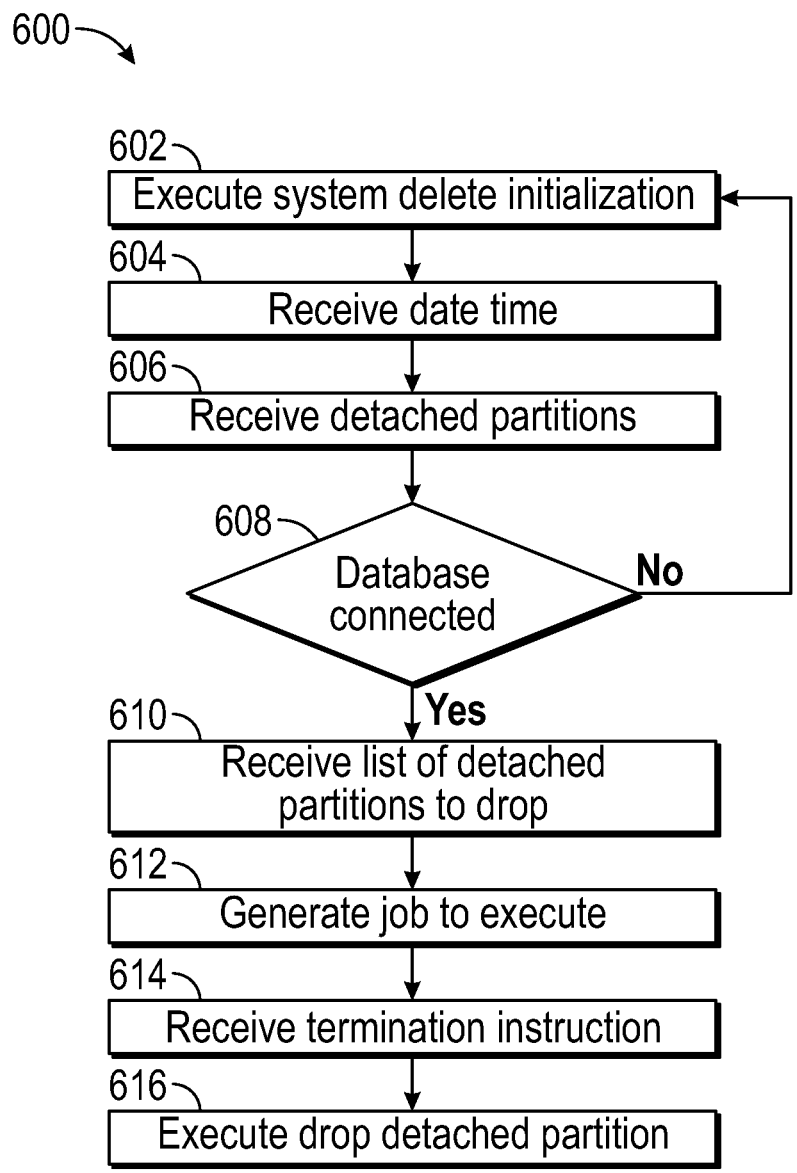
FIG. 6 illustrates a flowchart exemplifying deleting partitioned data control logic, in accordance with one or more exemplary embodiments of the present disclosure.

At step 522, the control logic 500 can execute a drop the detached partitions function to delete the data based on the instructions, as described in more detail in FIG. 6.

At step 524, the control logic 500 can receive termination instructions. For example, the termination instructions can include a user enabled instruction to force the control logic 500 to cease operations. The control logic 500 proceeds to step 526.

At step 526, the control logic 500 can determine whether an error exists in a plurality of logs. In another embodiment, the control logic 500 collects the logs to identify any errors. If an error is detected, then the control logic 500 proceeds to step 528. If an error is not detected, then the control logic 500 proceeds to terminate the instructions.

At step 528, the control logic 500 can transmit an error notification. In another embodiment, the control logic 500 can transmit the error notification to any user on a user list. For example, the control logic 500 can generate an error message and send an email to all users on a listserv. The control logic 500 proceeds to terminate the instructions.

FIG. 6 illustrates a flowchart exemplifying deleting partitioned data control logic 600, in accordance with one or more exemplary embodiments of the present disclosure. The deleting partitioned data control logic 600 can be implemented as an algorithm on a server 102, a machine learning module, a client, a database, or other suitable system. Additionally, the deleting partitioned data control logic 600 can implement or incorporate one or more features of the drop partition system 208, including drop partition information module 128, partition drop monitor module 130, and drop partition error module 132. The deleting partitioned data control logic 600 can be achieved with software, hardware, an API, a network connection, a network transfer protocol, HTML, DHTML, JavaScript, Dojo, Ruby, Rails, other suitable applications, or suitable combinations thereof.

The deleting partitioned data control logic 600 can leverage the ability of a computer platform to spawn multiple processes and threads by processing data simultaneously. The speed and efficiency of the deleting partitioned data control logic 600 can be greatly improved by instantiating more than one process to implement deleting partitioned data. However, one skilled in the art of programming will appreciate that use of a single processing thread may also be utilized and is within the scope of the present disclosure.

The deleting partitioned data control logic 600 of the present embodiment begins at step 522, where the deleting partitioned data control logic 600 can receive a drop detach instruction according to step 522 of FIG. 5. In one embodiment, commands or data can be received via user input generated on a client or server, such as a screen tap, swipe, mouse click, key press, voice command, or other suitable mechanism. In another embodiment, the inspection commands or data can include inspection data having one or more fields, parameters, characteristics, or metadata, related to an inspection. The deleting partitioned data control logic 600 then proceeds to step 602.

At step 602, the control logic 600 can execute system delete initialization. In another embodiment, the control logic 600 can initialize a configuration file and determine whether required file systems are accessible. For example, if the required file systems are accessible, the control logic 600 can initialize variables used in executing drop detached data operations from the database. The control logic 600 can also provide a user interface for modifying an administrative portion, including algorithms and thresholds. The control logic 600 proceeds to step 604.

At step 604, the control logic 600 can receive date time of a target table. In another embodiment, the control logic 600 can establish date time ranges and value to determine whether a partition already exists or can be created. In another embodiment, the control logic 600 can identify whether the table is at a capacity for partitions or is within a range for a particular partition. The control logic 600 proceeds to step 606.

At step 606, the control logic 600 can receive the detached partitions. For example, the detached partitions can include data that is unnecessary, thus can be deleted. In another embodiment, the control logic 600 can receive the detached partitions in the form of a table identifying the detached partitions using various identifiers. For example, the detached partitions can be included in new tables or existing tables. The control logic 600 proceeds to step 608.

At step 608, the control logic 600 can determine whether a database is connected. In another embodiment, the control logic 600 can execute from a remote server. In another embodiment, when a database is connected, the control logic 600 can collect metric data about cluster members of the database. For example, cluster members of the database are particular groups of data structures with assigned identification providing information regarding the identifications of the data structures. If the database is not connected, then the control logic 600 proceeds to step 602. If the database is connected, then the control logic 600 proceeds to step 610.

At step 610, the control logic 600 can receive list of the detached partitions to drop. In another embodiment, the control logic 600 can determine which of the detached partitions to drop. For example, not all of the detached partitions are unnecessary, so the control logic 600 can determine whether to keep at least some of the detached partitions. The control logic proceeds to step 612.

At step 612, the control logic 600 can generate a job to execute the drop instructions. For example, the control logic 600 can generate an operation to identify which of the detached partitions to delete. In another embodiment, the control logic 600 can execute a plurality of jobs in a multithreaded environment allowing the jobs to be executed in parallel. In another embodiment, the control logic 600 can execute each job and monitor each job independently. For example, the control logic 600 can obtain information regarding the number of jobs to be executed, the number of tablespaces to delete, the number of jobs yet to be executed, among other information relevant to processing the dropped partitions, and execute instructions corresponding to the foregoing information. The control logic 600 proceeds to step 614.

At step 614, the control logic 600 can receive termination instructions. For example the termination instructions can include a user enabled instruction to force the control logic 600 to cease operations. The control logic 600 proceeds to step 616.

At step 616, the control logic 600 can execute the instruction to drop the detached partition. In another embodiment, the control logic 600 can delete the detached partitions unnecessary for operation. For example, the control logic 600 can execute alter statements to delete the data from the table in the database.

FIG. 7 illustrates a flowchart exemplifying single key partition control logic 700, in accordance with one or more exemplary embodiments of the present disclosure. The single key partition control logic 700 can be implemented as an algorithm on a server 102, a machine learning module, a client, a database, or other suitable system. Additionally, the single key partition control logic 700 can implement or incorporate one or more features of the add partition system 204, including add partition information module 116, partition add monitor module 118, and add partition error module 120. The single key partition control logic 700 can be achieved with software, hardware, an API, a network connection, a network transfer protocol, HTML, DHTML, JavaScript, Dojo, Ruby, Rails, other suitable applications, or suitable combinations thereof.

The single key partition control logic 700 can leverage the ability of a computer platform to spawn multiple processes and threads by processing data simultaneously. The speed and efficiency of the single key partition control logic 700 can be greatly improved by instantiating more than one process to implement single key partition. However, one skilled in the art of programming will appreciate that use of a single processing thread may also be utilized and is within the scope of the present disclosure.

The single key partition control logic 700 of the present embodiment begins at step 416, where the single key partition control logic 700 can receive a single key verification instruction according to step 416 of FIG. 4. In one embodiment, commands or data can be received via user input generated on a client or server, such as a screen tap, swipe, mouse click, key press, voice command, or other suitable mechanism. In another embodiment, the inspection commands or data can include inspection data having one or more fields, parameters, characteristics, or metadata, related to an inspection. The single key partition control logic 700 then proceeds to step 702.

At step 702, the control logic 700 can execute system single key initialization based on partitions of data. In another embodiment, the partitions can include a single key partition including either a date, group value, or member value. For example, the single key partition can include a date range. The single key partition control logic 700 then proceeds to step 704.

At step 704, the control logic 700 can receive a member list of data clusters in the database. In another embodiment, the control logic 700 can identify whether a cluster in the database includes the single key partition. For example, the control logic 700 can compare the identification of the cluster in the database with the single key partition to determine whether the the cluster includes the single key partition. The single key partition control logic 700 then proceeds to step 706.

At step 706, the control logic 700 can determine a definition for an optional input parameter. In another embodiment, the control logic 700 can identify whether an input request includes the optional input parameter. For example, the optional input parameter can identify whether the size of the data corresponding to the single key partition is greater than a normal size of a table in the database (e.g., LONG definition). When the input lacks the optional input parameter, the control logic 700 executes under normal conditions. The single key partition control logic 700 then proceeds to step 708.

At step 708, the control logic 700 can determine a single key range for the partition. In another embodiment, the single key range can include a date or time. For example, the single key range for the partition can include month, week, day, or hour. The control logic 700 then proceeds to step 710.

At step 710, the control logic 700 can generate alter statements for table manipulation corresponding to using the partitions. For example, the control logic 700 can generate the alter statements to add a column to a table in the database to attach the data to the table based on the single key partition. In another embodiment, the alter statements can include SQL alter table statements, Transact-SQL alter table statements, or other alter statements. The single key partition control logic 700 then proceeds to step 712 and step 714.

At step 712, the control logic 700 can generate a document of the alter statements. For example, the control logic 700 can generate executable documents including the alter statements for future use in another system, such as a UNIX system. In another embodiment, the control logic 700 can assign at least one tablespace to the single key partition. The at least one tablespace can indicate a data entry range for the database.

At step 714, the control logic 700 can generate a unique batch job for each table in the database. In another embodiment, the control logic 700 can store the unique batch job locally to rerun or restart the table modifications. For example, the unique batch jobs can include simple text documents that can execute from a command line interface.

FIG. 8 illustrates a flowchart exemplifying multi-key partition control logic 800, in accordance with one or more exemplary embodiments of the present disclosure. The multi-key partition control logic 800 can be implemented as an algorithm on a server 102, a machine learning module, a client, a database, or other suitable system. Additionally, the multi-key partition control logic 800 can implement or incorporate one or more features of the add partition system 204, including add partition information module 116, partition add monitor module 118, and add partition error module 120. The multi-key partition control logic 800 can be achieved with software, hardware, an API, a network connection, a network transfer protocol, HTML, DHTML, JavaScript, Dojo, Ruby, Rails, other suitable applications, or suitable combinations thereof.

The multi-key partition control logic 800 can leverage the ability of a computer platform to spawn multiple processes and threads by processing data simultaneously. The speed and efficiency of the multi-key partition control logic 800 can be greatly improved by instantiating more than one process to implement multi-key partition. However, one skilled in the art of programming will appreciate that use of a single processing thread may also be utilized and is within the scope of the present disclosure.

The multi-key partition control logic 800 of the present embodiment begins at step 414, where the multi-key partition control logic 800 can receive a multi-key verification instruction according to step 414 of FIG. 4. In one embodiment, commands or data can be received via user input generated on a client or server, such as a screen tap, swipe, mouse click, key press, voice command, or other suitable mechanism. In another embodiment, the inspection commands or data can include inspection data having one or more fields, parameters, characteristics, or metadata, related to an inspection. The multi-key partition control logic 800 then proceeds to step 802.

At step 802, the control logic 800 can execute system multi-key initialization based on partitions of data. In another embodiment, the partitions can include a multi-key partition including at least two of a date, group value, and member value. For example, the multi-key partition can include a date range. The control logic 800 then proceeds to step 804.

At step 804, the control logic 800 can receive a member list of data clusters in the database. In another embodiment, the control logic 800 can identify whether a cluster in the database includes the single key partition. For example, the control logic 800 can compare the identification of the cluster in the database with the single key partition to determine whether the the cluster includes the multi-key partition. The control logic 800 then proceeds to step 806.

At step 806, the control logic 800 can determine a definition for an optional input parameter. In another embodiment, the control logic 800 can identify whether an input request includes the optional input parameter. For example, the optional input parameter can identify whether the size of the data corresponding to the single key partition is greater than a normal size of a table in the database (e.g., LONG definition). When the input lacks the optional input parameter, the control logic 800 executes under normal conditions. The single key partition control logic 800 then proceeds to step 808.

At step 808, the control logic 800 can determine a single key range for at least one of the partitions. In another embodiment, the single key range can include a date or time. For example, the single key range for the partition can include month, week, day, or hour. The control logic 800 then proceeds to step 810.

At step 810, the control logic 800 can determine construction of a key pattern for the partitions. In another embodiment, the key pattern for the partitions can include a date, a member value, and a group value. The member value can indicate whether at least one of the partitions belongs to a cluster of data objects in the database. The group value can indicate a particular group of the data objects at least one of the partitions belong. In another embodiment, the control logic 800 can construct a partition name based on the key pattern. The control logic 800 then proceeds to step 812.

At step 812, the control logic 800 can generate alter statements to add multiple partitions. For example, at least one of the alter statements can correspond to the at least one of the partitions. In another embodiment, the control logic 800 can generate a loop to perform partition name and tablespace assignments when partitioning data using a cluster database. The control logic 800 then proceeds to step 814.

At step 814, the control logic 800 can generate alter statements for table manipulation corresponding to using the partitions. For example, the control logic 800 can generate the alter statements to add a column to a table in the database to attach the data to the table based on the single key partition. In another embodiment, the alter statements can include SQL alter table statements, Transact-SQL alter table statements, or other alter statements. The control logic 800 then proceeds to step 816 and step 818.

At step 816, the control logic 800 can generate a document of the alter statements. For example, the control logic 800 can generate executable documents including the alter statements for future use in another system, such as a UNIX system. In another embodiment, the control logic 800 can assign at least one tablespace to the single key partition. The at least one tablespace can indicate a data entry range for the database.

At step 818, the control logic 800 can generate a unique batch job for each table in the database. In another embodiment, the control logic 800 can store the unique batch job locally to rerun or restart the table modifications. For example, the unique batch jobs can include simple text documents that can execute from a command line interface.

Figure 9:
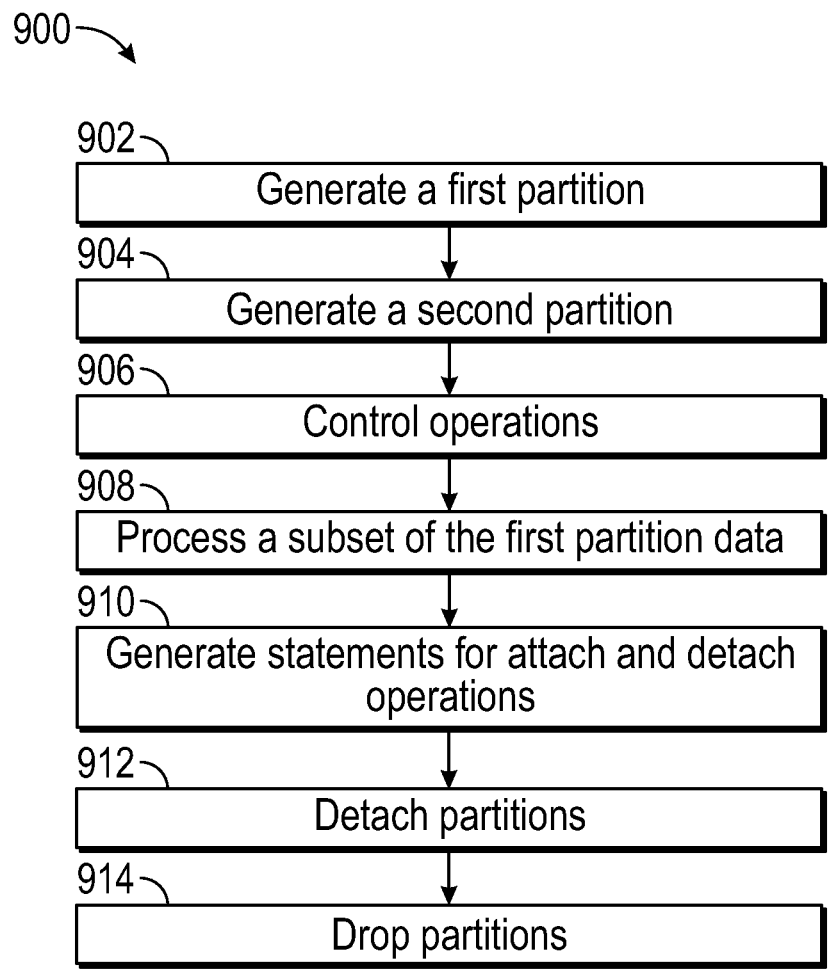
FIG. 9 illustrates a flowchart exemplifying data partitioning management control logic, in accordance with one or more exemplary embodiments of the present disclosure.

FIG. 9 illustrates a flowchart exemplifying data partitioning management control logic 900, in accordance with one or more exemplary embodiments of the present disclosure. The data partitioning management control logic 900 can be implemented as an algorithm on a server 102, a machine learning module, a client, a database, or other suitable system. Additionally, the data partitioning management control logic 900 can implement or incorporate one or more features of the dynamic partition management system 200, including the configuration system 202, add partition system 204, detach partition system 206, and drop partition system 208. The data partitioning management control logic 900 can be achieved with software, hardware, an API, a network connection, a network transfer protocol, HTML, DHTML, JavaScript, Dojo, Ruby, Rails, other suitable applications, or suitable combinations thereof.

The data partitioning management control logic 900 can leverage the ability of a computer platform to spawn multiple processes and threads by processing data simultaneously. The speed and efficiency of the data partitioning management control logic 900 can be greatly improved by instantiating more than one process to implement data lifecycle management. However, one skilled in the art of programming will appreciate that use of a single processing thread may also be utilized and is within the scope of the present disclosure.

In one embodiment, commands or data can be received via user input generated on a client or server, such as a screen tap, swipe, mouse click, key press, voice command, or other suitable mechanism. In another embodiment, the inspection commands or data can include inspection data having one or more fields, parameters, characteristics, or metadata, related to an inspection. The data partitioning management control logic 900 then proceeds to step 902.

At step 902, the control logic 900 can generate a first partition having data related to a first category. For example, the first category can include one of a key pattern group, such as a date, group value, or member value. The group value can include information about a cluster of data structures in the database. The member value can include whether the one or more partitions is a member to a particular group in the database. The first partition can be used to modify data such as attaching data to or detaching data from a data object in the database. In another embodiment, the control logic 900 can generate the first partition based on a single key partition or a multi-key partition. The control logic 900 then proceeds to step 904.

At step 904, the control logic 900 can generate a second partition having data related to a second category. For example, the second category can include one of a key pattern group, such as a date, group value, or member value. The group value can include information about a cluster of data structures in the database. The member value can include whether the one or more partitions is a member to a particular group in the database. The second partition can be used to modify data, such as attaching data to or detaching data from a data object in the database. In another embodiment, the control logic 900 can generate the second partition based on a single key partition or a multi-key partition. The control logic 900 then proceeds to step 906.

At step 906, the control logic 900 can control operations via a configuration file that identifies one or more partitions and one or more rules. For example, the configuration file can include the key pattern group to classify the one or more partitions. In another embodiment, the one or more rules can correspond to the categories of the partitions. For example, the one or more rules can define a classification of whether one of the partitions is a member of the key pattern groups. The control logic 900 then proceeds to step 908.

At step 908, the control logic 900 can process a subset of the first partition data according to the rules in the configuration file. For example, the control logic 900 can identify whether the subset of the first partition data is a member of a particular group. The control logic 900 then proceeds to step 910.

At step 910, the control logic 900 can detach partitions based on the rules in the configuration file. In another embodiment, the control logic 900 can identify the partitions opposing the rules of the configuration file and execute alter statements to detach the partitions, detach the data corresponding to the partitions, detach the entire table, or detach some other relevant data structure of the database. Detaching a data structure modifies any prior order to identify the data structure based on an address from a previous position to a new position. The new position can be an existing table or a new table. The control logic 900 then proceeds to step 912.

At step 912, the control logic 900 can delete partitions based on the rules in the configuration file. In another embodiment, the control logic 900 can identify the partitions opposing the rules of the configuration and execute alter statements to delete the partitions, the data corresponding to the partitions, the entire table, or some other relevant data structure of the database.

The present disclosure achieves at least the following advantages:

1. provides data management systems with the ability to attach, detach, and drop segments of data based on partitions of the data objects to optimize database utilization;

2. increases the efficiency of database management via instructions focused on partitions;

3. provides an interface for managing data objects; and 4. provides accessible data management techniques, enabling faster and more-efficient data processing.

Persons skilled in the art will readily understand that advantages and objectives described above would not be possible without the particular combination of computer hardware and other structural components and mechanisms assembled in this inventive system and described herein. Additionally, the algorithms, methods, and processes disclosed herein improve and transform any general-purpose computer or processor disclosed in this specification and drawings into a special purpose computer programmed to perform the disclosed algorithms, methods, and processes to achieve the aforementioned functionality, advantages, and objectives. It will be further understood that a variety of programming tools, known to persons skilled in the art, are available for generating and implementing the features and operations described in the foregoing. Moreover, the particular choice of programming tool(s) may be governed by the specific objectives and constraints placed on the implementation selected for realizing the concepts set forth herein and in the appended claims.

The description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f). Even under the broadest reasonable interpretation, in light of this paragraph of this specification, the claims are not intended to invoke 35 U.S.C. § 112(f) absent the exact words "means for" or "step for," as described above.

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the inventions can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

What is claimed is:

1. A system for attaching and detaching partitioned data from a table, comprising:
a memory having a database with a plurality of tables for data management; and
a networked computer processor operably coupled to the memory and capable of executing machine-readable instructions to perform program steps, the program steps comprising:
receiving a database instruction;
identifying at least one action and at least one partition key from the database instruction;
obtaining a member list of the table;
determining a range for the single key information;
generating statements to alter the table based on the member list and the range;
generating, in response to the identification of at least one partition key, a tablespace to attach first partitioned data to a table of the database when the at least one action includes an add partition instruction;
generating a retention object when the at least one action includes a retain partition instruction;
adding the second partitioned data to another table to retain the second partitioned data; and
when the at least one action includes a detach partition instruction:
identifying metrics from the table of the database, wherein the metrics from the table include an indication of a partition quantity requirement of the table;
determining whether the partition quantity requirement of the table is satisfied, wherein determining that the partition quantity requirement of the table is satisfied includes comparing a number of partitions retained to a number of partitions allocated and determining that the number of partitions retained is less than the number of partitions allocated; and
detaching second partitioned data from the table in response to a determination that the partition quantity requirement of the table is satisfied.

2. The system of claim 1, wherein if the operational requirement is satisfied, then the system supports the at least one partition key.

3. The system of claim 1, wherein the database instruction comprises single key information, wherein the program steps further comprise:
obtaining a member list of the table;
determining a range for the single key information; and
generating statements to alter the table based on the member list and the range.

4. The system of claim 2, wherein the range comprises date information such as a year, a month, a week, a day, and an hour.

5. The system of claim 1, wherein the database instruction comprises multi-key information.

6. The system of claim 4, wherein the range comprises date information such as a year, a month, a week, a day, and an hour.

7. The system of claim 1, wherein the retention object includes a retention period.

8. The system of claim 1, wherein the program steps further comprise deleting the second partitioned data from the database when the second partitioned data reaches a time limit.

9. A method of attaching and detaching partitioned data from a table, comprising:
receiving a database instruction;
identifying at least one action and at least one partition key from the database instruction;
obtaining a member list of the table;
determining a range for the single key information;

generating statements to alter the table based on the member list and the range;

generating, in response to the identification of at least one partition key, a tablespace to attach first partitioned data to a table of the database when the at least one action includes an add partition instruction;

generating a retention object when the at least one action includes a retain partition instruction;

adding the second partitioned data to another table to retain the second partitioned data; and when the at least one action includes a detach partition instruction:
  identifying metrics from the table of the database, wherein the metrics from the table include an indication of a partition quantity requirement of the table;
  determining whether the partition quantity requirement of the table is satisfied, wherein determining that the partition quantity requirement of the table is satisfied includes comparing a number of partitions retained to a number of partitions allocated and determining that the number of partitions retained is less than the number of partitions allocated; and
  detaching second partitioned data from the table in response to a determination that the partition quantity requirement of the table is satisfied.

10. The method of claim 9, wherein if the operational requirement is satisfied, then the system supports the at least one partition key.

11. The method of claim 9, wherein the database instruction comprises single key information, wherein the program steps further comprise:
  obtaining a member list of the table;
  determining a range for the single key information; and
  generating statements to alter the table based on the member list and the range.

12. The method of claim 9, wherein the range comprises date information such as a year, a month, a week, a day, and an hour.

13. The method of claim 9, wherein the database instruction comprises multi-key information.

14. The method of claim 9, wherein the range comprises date information such as a year, a month, a week, a day, and an hour.

15. The method of claim 9, wherein the retention object includes a retention period.

16. The method of claim 9, wherein the program steps further comprise deleting the second partitioned data from the database when the second partitioned data reaches a time limit.

17. A computer-implemented method for attaching and detaching partitioned data from a table, the computer-implemented method comprising:
  identifying at least one action and at least one partition key from a database instruction;
  obtaining a member list of the table;
  determining a range for the single key information;
  generating statements to alter the table based on the member list and the range;
  generating, in response to the identification of at least one partition key, a tablespace to attach first partitioned data to a table of the database when the at least one action includes an add partition instruction;
  generating a retention object when the at least one action includes a retain partition instruction;
  adding the second partitioned data to another table to retain the second partitioned data; and
  when the at least one action includes a detach partition instruction:
    identifying metrics from the table of the database, wherein the metrics from the table include an indication of a partition quantity requirement of the table;
    determining whether the partition quantity requirement of the table is satisfied, wherein determining that the partition quantity requirement of the table is satisfied includes comparing a number of partitions retained to a number of partitions allocated and determining that the number of partitions retained is less than the number of partitions allocated; and
    detaching second partitioned data from the table in response to a determination that the partition quantity requirement of the table is satisfied.

18. The method of claim 17, wherein if the operational requirement is satisfied, then the system supports the at least one partition key.

19. The method of claim 17, wherein the database instruction comprises single key information, and further comprising:
  obtaining a member list of the table;
  determining a range for the single key information; and
  generating statements to alter the table based on the member list and the range.

20. The method of claim 19, wherein the range comprises date information such as a year, a month, a week, a day, and an hour.

21. The method of claim 19, wherein the database instruction comprises multi-key information.

22. The method of claim 21, wherein the range comprises date information such as a year, a month, a week, a day, and an hour.

23. The method of claim 19, wherein the retention object includes a retention period.

24. The method of claim 17, further comprise deleting the second partitioned data from the database when the second partitioned data reaches a time limit.

25. A method for dynamically partitioning and managing data at the partition level, including:
  generating a first partition having data related to a first category;
  generating a second partition having data related to a second category;
  controlling operations via a configuration file that identifies one or more partitions and one or more rules; and
  processing a subset of the first partition data according to the rules in the configuration file.

26. The method of claim 25, further comprising dynamically generating SQL statements for attach and detach operations based on the configuration file.

27. The method of claim 25, further comprising automatically detaching and dropping partitions based on the rules in the configuration file.

28. The method of claim 25, wherein the rules relate to the category.

29. The method of claim 25, wherein the first category is a first time frame and the second category is a second timeframe.

30. The method of claim 25, wherein a first rule transfers data from the first partition to the second partition.

* * * * *